United States Patent [19]
Wolf

[11] 3,913,197
[45] Oct. 21, 1975

[54] POSITIVE LOCK INSERT

[76] Inventor: Heinz K. Wolf, 36990 Chardon Road, Willoughby Hills, Ohio 44048

[22] Filed: Nov. 19, 1973

[21] Appl. No.: 417,071

[52] U.S. Cl. .................................. 29/105 R; 29/96
[51] Int. Cl.² ...................... B26D 1/12; B23C 5/22
[58] Field of Search ........................... 29/105 R, 96

[56] References Cited
UNITED STATES PATENTS

| 3,284,874 | 11/1966 | Green et al. ............................ 29/96 |
| 3,341,919 | 9/1967 | Lovendahl ............................ 29/105 |
| 3,488,822 | 1/1970 | Jones ...................................... 29/96 |
| 3,673,657 | 7/1972 | Gustafson et al. .................... 29/105 |
| 3,708,843 | 1/1973 | Erkfritz ............................. 29/105 A |
| 3,740,807 | 6/1973 | Getts ...................................... 29/96 |

Primary Examiner—Donald R. Schran
Assistant Examiner—William R. Briggs

[57] ABSTRACT

A locking structure for locking a cutting insert to a tool holder, the insert having a generally hour-glass shaped lock-screw receiving aperture therethrough. The lock-screw is provided with a head having a lower section which flares outwardly from the shank, a central cylindrical section and an upper section which converges in generally frusto-conical fashion. The axis of the lock-screw receiving aperture in the tool holder is slanted toward the plane or planes of one or more locating abutments on the holder. The components, when assembled, provide a positive lockdown for the insert in the tool holder, force the insert positively against the locating abutment or abutments and, yet, permit the insert to be removed without complete removal of the lock-screw.

8 Claims, 8 Drawing Figures

POSITIVE LOCK INSERT

BACKGROUND OF THE INVENTION

This invention relates to lockdown arrangements for cutting inserts and tool holders and, more particularly, to a specific arrangement wherein the insert is positively locked to the holder.

It has become customary in the machine-tool cutting arts to utilize throw-away cutting inserts on the tool holders. These inserts are designed, usually, such that the same can be indexed to two or more positions on the holder to provide a new cutting surface when that surface previously in the cutting position has become worn. These inserts, typically, are indexed repeatedly until all of the cutting surfaces have been utilized, thereafter discarded and a new insert installed.

It is necessary, of course, that some means be provided to accurately position the insert on the tool holder. These means typically take the form of upstanding abutments or locating surfaces on one or more sides of the insert pocket against which the nonworking sides of the insert are located. The insert is fastened in this position by means of a lock-screw threaded into a suitable aperture in the tool holder.

The lock-screw, preferably, functions not only to retain the insert on the tool holder but to ensure that it will maintain its proper relationship with respect to the locating abutment or abutments additionally. It is preferred, additionally, that the insert be removable for indexing or replacing from the tool holder without complete removal of the lock-screw.

Two successful methods have been utilized previously to accommodate these functional parameters. The first method, shown in U.S. Pat. No. 3,341,919 (assigned to the same assignee as the present invention) utilizes a lock-screw having a tapered head which is threaded into a slanted, tapped hole in the insert bed on the tool holder. The slant of this hole is directed toward the plane of the abutment and, as the screw is tightened it engages the cylindrical insert aperture on the side adjacent the abutment or abutments wedging it sideways toward the abutment as well as downwardly into firm engagement with the bed. The second of these methods, evolved by Metal Cutting Tools, Inc. of Rockford, Ill. utilizes a lockdown screw similar to that to be discussed hereinafter in connection with the present invention. It differs from the method shown in the aforenoted patent by engaging the cylindrical insert aperture not only on the side adjacent the abutment or abutments by means of a lowered tapered section but on the opposite side as well by means of an upper oppositely tapered section provided on the screw head. With either of the methods, as well as the method of the present invention, the lockdown-screw head is smaller in diameter than the insert aperture and, consequently, the insert may be removed thereover after limited loosening of the lockdown-screw.

Each of these prior art methods relies solely upon a frictional interfit between the lockdown-screw and the insert to retain the latter on the cutting tool. This frictional interfit has been and remains sufficient to ensure positive positioning of the insert in most cutting situations. Difficulty has been experienced, however, where the forces tending to displace the insert from its position on the tool holder are extreme, the same sometimes being sufficient to overcome the frictional interfit provided by the aforenoted methods. The instant invention, in contrast, provides a positive lock between the insert and the tool holder and, thus, ensures that no displacement of the insert will occur despite the concentration of rather heavy stresses thereon.

OBJECTS AND SUMMARY OF THE INVENTION

It is an object of this invention, therefore, to provide a lockdown arrangement for cutting inserts and tool holders which positively lock the insert to the holder rather than relying strictly upon frictional forces to retain it in position.

It is an object of this invention, more particularly, to provide such an arrangement wherein the advantages inherent in certain prior art lockdown arrangements are retained and it is possible, for example, to remove the insert from the holder without completely removing the lockdown-screw.

These and other objects of this invention are accomplished by use of a locking screw having a head including at least one tapered section engageable with a tapered or converging aperture in the insert. The screw is threaded into the holder along an axis oriented toward the plane of the locating abutment. The tapered section of the screw engages the aperture sidewall in such a manner as to sandwich a portion thereof between the insert bed and screw head, thus positively preventing movement of the insert thereafter.

DESCRIPTION OF THE DRAWINGS

This invention will be readily understood by those skilled in the art from a reading of the following specification and accompanying drawings in which.

DESCRIPTION OF THE PREFERRED EMBODIMENT

Figure 1:
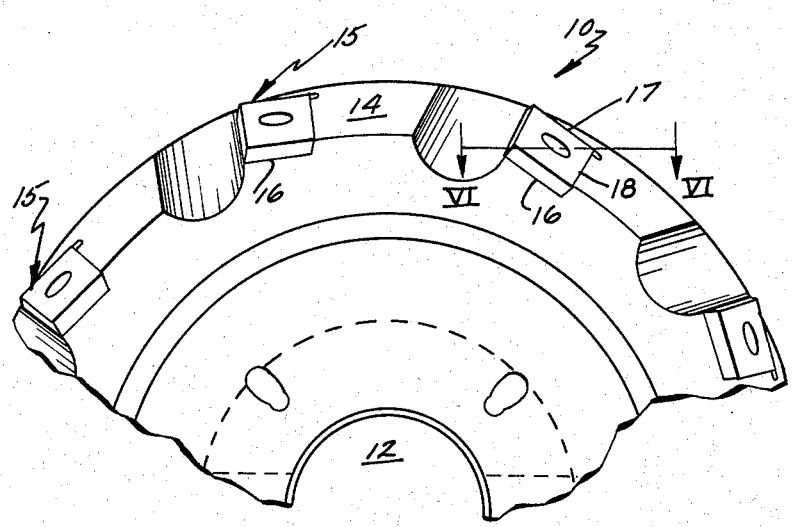
FIG. 1 is a fragmentary, front-elevation of a milling cutter body.
Figure 2:
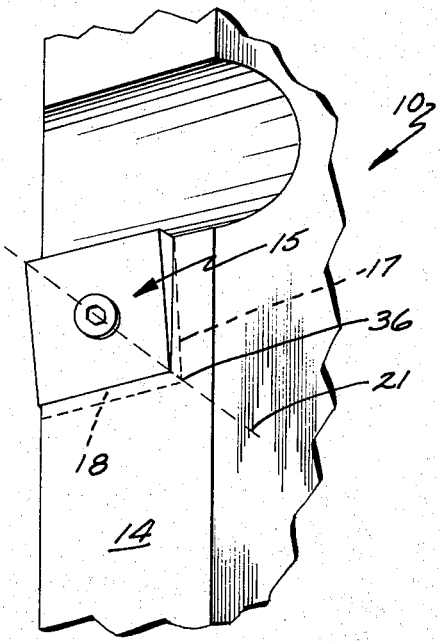
FIG. 2 is a fragmentary, side-elevation of the body of FIG. 1 illustrating an insert station on the frontal periphery thereof with an insert affixed therein.
Figure 3:
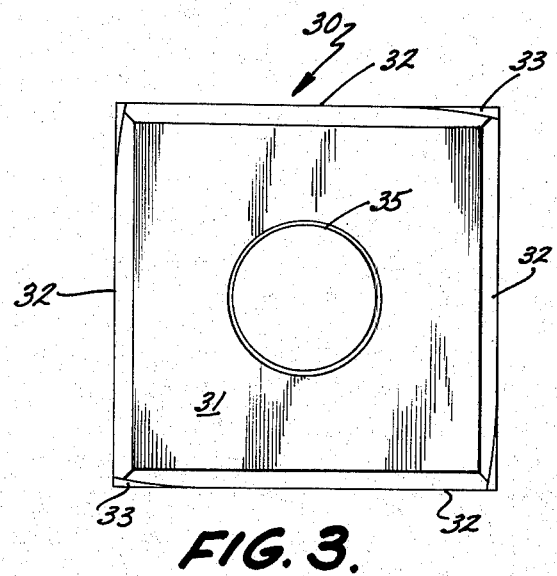
FIG. 3 is a front-elevation of a cutting insert specifically adapted to be affixed to the milling cutter of FIGS. 1 and 2 by means of the novel lockdown arrangement which is the subject of this invention.

Attention is directed, initially, to FIGS. 1 and 2 which illustrate a milling cutting body 10 having an axial bore 12 adapted to receive and be affixed to the pilot of a conventional milling machine. The cutter body shown in these figures is identical to that shown in detail and claimed in patent application, Ser. No. 273,138 filed July 19, 1972 and assigned to the same assignee as the present invention. This application is specifically incorporated by reference herein.

The milling cutter body 10 has a plurality of insert stations or pockets located about the frontal periphery thereof on the sloped surface of the frustoconical section 14. Each of these stations or pockets includes a flat bed or insert supporting surface 16 upon which the insert rests, an upstanding rear locating abutment 17 and an upstanding trailing locating abutment 18. Abutments 17 and 18 are generally perpendicular to bed 16. The bed 16 and the abutments 17 and 18 function, as is explained in detail in the aforenoted patent application, to accurately position the insert as to rake, lead, run-out and the like with respect to the cutter body.

Each of the beds 16 of the insert stations 15 is provided with a tapped aperture or hole extending generally radially inwardly along an axis 21 (see FIG. 2). Axis 21, in accordance with the preferred embodiment of this invention, is at a 15° angle with respect to the plane of the bed 16 and directed so as to pass through the intersection of the planes containing the rear and trailing upstanding locating abutments 17 and 18, respectively. Tightening of the lockdown-screw with the insert in position, thus, will tend to force the insert firmly toward the intersection of the two abutment surfaces and down against the supporting surface or bed in the specific manner to be described hereinafter.

Referring now additionally to FIGS. 3 through 6, there is illustrated an insert 30 adapted for use in conjunction with the present invention. Insert 30 has opposed, square faces 31 joined by four sides 32. Sides 32 are generally perpendicular to faces 31. The edges and faces are shaped, in accordance with the teachings of the aforenoted patent application, to provide a series of eight separate cutting edges 33. The insert, thus, is rotatably indexible to four separate locations and, after having been turned over, to four more locations.

The present invention provides a means whereby a cutting insert can be positively locked to the tool. To this end the insert of the instant invention is provided with a generally hour-glass configured lockdown aperture through the center thereof, the same consisting of two frustoconical shaped sections 35A and 35B converging at the center of the insert. Sidewalls 35A and 35B form, in the preferred embodiment, an angle of approximately 95° with respect to the adjacent faces of the insert, or, differently stated, an angle of approximately 5° with a line parallel to the axis of the insert aperture and abutting the narrowest portion thereof.

Figure 4:
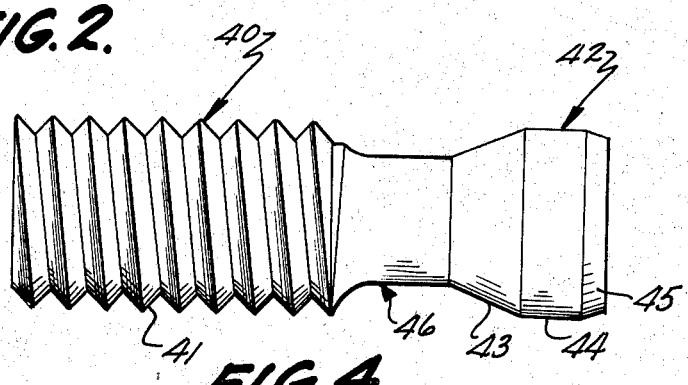
FIG. 4 is a side-elevation of a lockdown-screw particularly adapted for utilization in conjunction with the invention.
Figure 5:
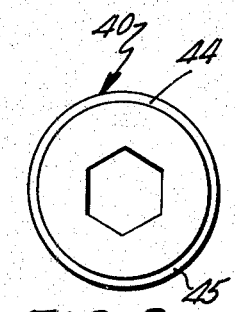
FIG. 5 is an end-elevation of the lockdown-screw as shown in FIG. 4.

The locking screw 40 adapted for use in conjunction with the instant invention is shown in FIGS. 4 and 5. This screw, it is to be noted, is generally similar to that utilized in the Metcut method referred to previously. It includes a threaded shank 41, a narrowed shoulder 46 and a head 42. Head 42 contains a lower section 43 which flares outwardly from shoulder 46 in frustoconical fashion, a central section 44 which is cylindrical in shape and extends upwardly from lower section 43, and an upper section 45 which converges in frustoconical fashion in the manner shown. The diameter of head 42 at its maximum point is less than the diameter of the hour-glass shaped aperture 34 in insert 30 at its narrowest point. These relative dimensions permit the insert to be placed over the head of the screw when the same is loosely inserted in aperture 20 of the cutter body as will be readily appreciated by those skilled in the art.

It has been found for a ¾-inch insert that with axis 21 at 15° to the bed and with the 5° taper insert aperture discussed previously, lower section 43 should be at an angle of approximately 22° with respect to the axis of the screw and upper section 45 at an angle of approximately 11°. With these angles, a screw having a diameter of approximately 0.302 inches at cylindrical section 44 and an insert having a lockdown aperture diameter of approximately 0.312 inches at its narrowest point will provide excellent results. These dimensions and angles will vary somewhat, as will be readily appreciated by those skilled in the art, for differently sized inserts.

Figure 6:
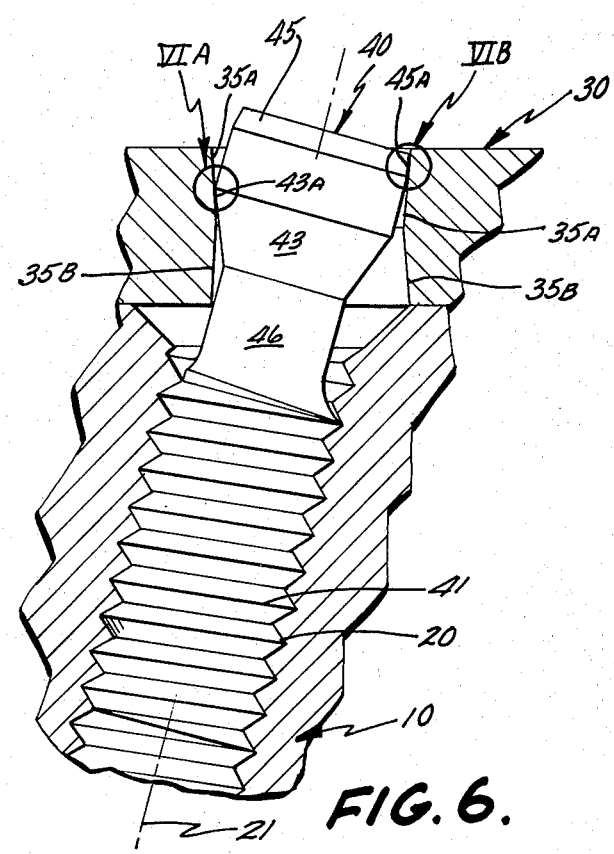
FIG. 6 is an enlarged, cross-sectional view showing an insert affixed in position; this view is taken along a plane perpendicular to the insert bed and passing through line VI—VI in FIG. 1.

Referring now specifically to FIG. 6, the operation of the locking arrangement which is the subject to this invention will be described in detail. The locking screw 40 is threaded into one of the tapped apertures 20 in the tool body and an insert 30 placed thereover. The corner 36 of the insert 30 will lie adjacent the intersection of upstanding abutments 17 and 18 when this process has been completed.

The locking screw 40 is then tightened to move the same downwardly as viewed in FIG. 6 until convexo-conical surface 43A of lower section 43 contacts concave-conical surface 35A of the insert and convexo-conical surface 45A of upper section 45 contacts the opposite side of concave-conical surface 35A. As the locking screw 40 is tightened, the insert 30 is urged firmly into abutment with the two locating surfaces 17 and 18 and forced against supporting surface 16 because of the angular nature and direction of the tapped hole 20.

As is seen clearly in FIG. 6, the angular relationships between surfaces 35A, 43A and 45A, in conjunction with the abutments 17 and 18, will positively prevent insert removal without loosening of the lockscrew. Stated in another fashion, it will be impossible for the insert to move other than through a series of planes parallel to the bed 16 because of the upstanding locating abutments 17 and 18 and the urging of the insert thereagainst by screw 40. Such movement, in turn, is positively prevented by the overlying, angular relationship of the surfaces 43A and 45A with respect to surface 35A, the latter surface being effectively sandwiched between the bed and the sloped surfaces of the locking screw head.

When it is desirable to index or remove the insert such that a new cutting edge will be brought into cutting position, it is necessary only to loosen lockscrew 40 sufficiently to permit the insert to be tilted so that it is normal to the axis of the locking screw. The insert thereafter may be raised through a series of parallel planes until it clears the locating abutments 17 and 18. Once such clearance has been achieved, the insert may be removed or rotated to bring the new edge into position, pushed back downwardly into abutment with the bed and the screw retightened.

Figure 6A:
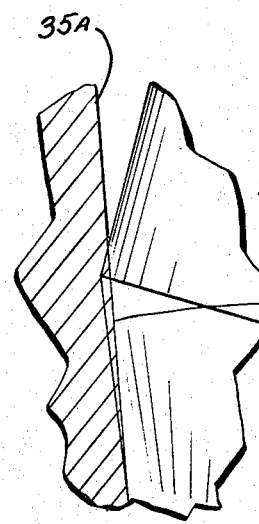
FIGS. 6A and 6B are fragmentary, enlarged views taken at the circles VIA and VIB in FIG. 6 illustrating the locking screw without shifting due to thread tolerance.
Figure 6B:
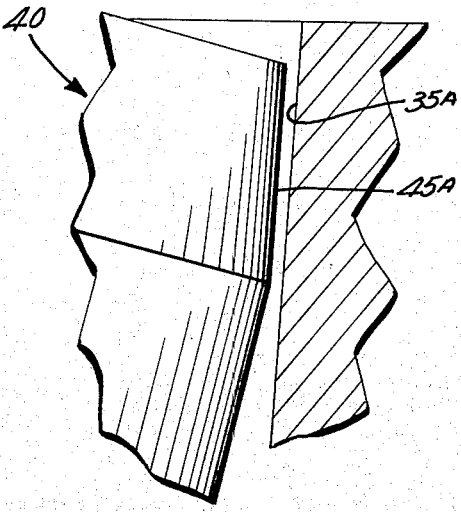

The locking screw 40 is illustrated in FIGS. 6A and 6B as having its surface 43A slightly penetrating surface 35A of the insert and its surface 45A slightly spaced therefrom. This, of course, is not the case in actual practice as shown in FIG. 6. This slight misalignment in the direction indicated is utilized, rather, to accommodate thread clearance between the locking screw 40 and the tapped aperture 20 in the cutter body. The instant invention does not require any type of bending or deformation of the locking screw 40. It does preferably involve a slight shifting of the locking screw to bring its still-straight axis out of precise coincidence with the axis 21 of aperture 20 to accommodate for the thread clearance. With the insert in tight abutment with the locating abutments 17 and 18, the locking screw 40, in actual practice, is shifted slightly in a clockwise direction from that shown in FIGS. 6A and 6B. This shifting brings surfaces 43A and 45A into tight abutment with surface 35A (or surface 35B should the insert be inverted) of the generally hour-glass shaped aperture 34 in insert 30 as illustrated in FIG. 6.

The instant invention, thus, provides the advantage of a positive lock obtainable heretofore insofar as is known to Applicant, only by use of a locking screw with a head which had to be completely removed from the holder in order to remove the insert. The provision of this positive lock, yet, is accomplished while retaining the advantages of the heretofore available lockdown arrangements which permit removal of the insert without total removal of the lockdown screw.

While the preferred embodiment of this invention has been described in detail, it will be readily apparent to those skilled in the art that other embodiments may be conceived and fabricated without departing from the scope of this invention. Such other embodiments are to be deemed as included within the scope of the dependent claims unless these claims, by their language, expressly state otherwise.

The embodiments of the invention in which an exclusive property or privilege is claimed are defined as follows:

1. In a locking apparatus for locking cutting inserts onto a tool body, the body having a bed on which the insert is adapted to be positioned, one or more locating abutments adjacent the bed against which the insert is abutted to locate it in cutting position, and a tapped hole extending into said body at an angle from said bed toward the general plane of said locating abutment, the improvement comprising said insert including a central aperture at least a portion of said aperture being frusto conical such that when said insert is positioned on said bed the exposed portion of said aperture converges toward said bed, a locking screw having a threaded shank receivable in said hole and a head, said head having a lower section which flares outwardly from said shank and an upper section which converges inwardly toward the top of said screw, the diameter of said aperture at its narrowest point being greater than the diameter of said head at its widest point, said insert being forced into contact with said abutment and said bed with portions of said insert in contact with both said upper and lower sections of said head, and said lower section of said head engaging and overlying said exposed portion of said aperture adjacent said abutment and said upper section of said head engaging and overlying said exposed portion of said aperture remote from said abutment when said locking screw is tightened with said insert on said bed to positively lock said insert in position preventing physical removal of said insert without loosening said locking screw.

2. The apparatus as set forth in claim 1 wherein said insert has opposed faces joined by sides which are generally perpendicular to said faces and wherein said abutments are generally perpendicular to said bed.

3. The apparatus as set forth in claim 2 wherein said insert is adapted to be positioned on said bed on either of its opposed, parallel faces and wherein said aperture is hour-glass shaped.

4. The apparatus as set forth in claim 3 wherein there are two of said abutment surfaces and wherein said tapped hole extends into said body from said bed toward the intersection of the general planes thereof.

5. The apparatus as set forth in claim 1 wherein there are two of said abutment surfaces and wherein said tapped hole extends into said body from said bed toward the intersection of the general planes thereof.

6. The apparatus as set forth in claim 1 wherein said lower and upper sections are generally frusto-conical in shape.

7. The apparatus as set forth in claim 6 wherein said lower and upper sections are separated by a cylindrical central section.

8. The apparatus as set forth in claim 1 wherein, when said screw has been tightened with said upper and lower sections in engagement with said exposed portion of said aperture and said insert in tight abutment with said bed and locating surfaces, the axis of said tapped hole is displaced slightly from the axis of said screw to compensate for thread clearance.

* * * * *